(12) United States Patent
Takeda

(10) Patent No.: US 7,727,921 B2
(45) Date of Patent: Jun. 1, 2010

(54) DIELECTRIC CERAMIC COMPOSITION AND MONOLITHIC CERAMIC CAPACITOR

(75) Inventor: Toshikazu Takeda, Omihachiman (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 0 days.

(21) Appl. No.: 12/540,824

(22) Filed: Aug. 13, 2009

(65) Prior Publication Data

US 2009/0290285 A1    Nov. 26, 2009

Related U.S. Application Data

(63) Continuation of application No. PCT/JP2008/051234, filed on Jan. 29, 2008.

(30) Foreign Application Priority Data

Feb. 22, 2007   (JP) ............................. 2007-042330

(51) Int. Cl.
*C04B 35/495* (2006.01)
*H01G 4/12* (2006.01)
(52) U.S. Cl. ..................... 501/135; 361/321.4
(58) Field of Classification Search ............... 501/135; 361/321.4
See application file for complete search history.

(56) References Cited

U.S. PATENT DOCUMENTS

| 7,381,671 B2 * | 6/2008 | Ogiso .......................... 501/135 |
| 7,393,803 B2 | 7/2008 | Takeda et al. |
| 2005/0260410 A1 | 11/2005 | Fujikawa et al. |

FOREIGN PATENT DOCUMENTS

| JP | 11-240759 A | 9/1999 |
| JP | 11273989 | * 10/1999 |
| JP | 2000114093 | * 4/2000 |
| JP | 2003-020275 A | 1/2003 |

* cited by examiner

*Primary Examiner*—Karl E Group
(74) *Attorney, Agent, or Firm*—Dickstein Shapiro LLP

(57) ABSTRACT

A dielectric ceramic composition that is used for a monolithic ceramic capacitor, can be cofired with internal electrodes mainly composed of Ni at a temperature of 1200° C. or less, and has a high resistivity is provided. The dielectric ceramic composition is mainly composed of a tungsten bronze type complex oxide having a composition formula of $(K_{1-x}Na_x)Sr_2Nb_5O_{15}$ (wherein $0 \leqq x < 0.2$) and further contains, as accessory components, 0.05 to 20 molar parts of R (wherein R is at least one selected from the group consisting of Y, La, Pr, Nd, Sm, Eu, Gd, Tb, Dy, Ho, Er, Tm, Yb, and Lu) and 0.05 to 40 molar parts of M (wherein M is at least one selected from the group consisting of Mn, V, Li, Si, Ni, Cr, Co, Fe, Zn, Mg, and Zr) per 100 molar parts of the main component.

20 Claims, 1 Drawing Sheet

DIELECTRIC CERAMIC COMPOSITION AND MONOLITHIC CERAMIC CAPACITOR

This is a continuation of application Ser. No. PCT/JP2008/051234, filed Jan. 29, 2008, the contents of which are incorporated herein by reference.

TECHNICAL FIELD

The present invention relates generally to a dielectric ceramic composition and a monolithic ceramic capacitor and, more particularly, to a dielectric ceramic composition basically composed of $KSr_2Nb_5O_{15}$ having a tungsten bronze structure and a monolithic ceramic capacitor manufactured using the dielectric ceramic composition.

BACKGROUND ART

A monolithic ceramic capacitor, which is a main application of the present invention, is generally manufactured in the following way.

First, a ceramic green sheet containing a dielectric ceramic raw material on which an electroconductive material having a desired pattern to be formed into an internal electrode is applied is prepared.

A plurality of ceramic green sheets including the ceramic green sheets on which the electroconductive material was applied are stacked and bonded by heat pressing to form a green laminate.

The green laminate is then fired to produce a sintered laminate. The laminate includes internal electrodes formed of the electroconductive material described above.

External electrodes electrically connected to particular internal electrodes are then formed on the outer surface of the laminate. For example, the external electrodes are formed by applying an electroconductive paste that contains an electroconductive metal powder and a glass frit to the outer surface of the laminate and baking the electroconductive paste. A monolithic ceramic capacitor is thus completed.

It is desirable to use inexpensive Ni as a material of the internal electrodes to reduce the manufacturing cost of the monolithic ceramic capacitor. In this case, because Ni is a base metal, the firing atmosphere must be a reducing atmosphere to prevent oxidation of Ni during the firing process of the laminate.

In order to fire the laminate in a reducing atmosphere, the dielectric ceramic material should be resistant to reduction. International Publication WO 2006/114914 (hereinafter referred to as Patent Document 1) discloses a $KSr_2Nb_5O_{15}$ ceramic composition as a reduction resistant material having excellent electrical characteristics. This ceramic composition has a tungsten bronze crystal structure and differs completely from barium titanate having a perovskite structure.

[Patent Document 1] International Publication WO 2006/114914

DISCLOSURE OF INVENTION

Problems to be Solved by the Invention

The $KSr_2Nb_5O_{15}$ ceramic composition described in Patent Document 1 provides a high dielectric constant for a monolithic ceramic capacitor that includes internal electrodes mainly composed of Ni.

However, although the $KSr_2Nb_5O_{15}$ ceramic composition described in Patent Document 1 has a high dielectric constant $\in$, the $KSr_2Nb_5O_{15}$ ceramic composition has an insufficient resistivity $\rho$. The monolithic ceramic capacitor therefore may operate unstably at a high driving voltage.

In view of the problems described above, it is an object of the present invention to provide a dielectric ceramic composition having a sufficient resistivity and a monolithic ceramic capacitor manufactured using the dielectric ceramic composition.

Means for Solving the Problems

A dielectric ceramic composition according to the present invention is mainly composed of a tungsten bronze type complex oxide having a composition formula of $(K_{1-x}Na_x)Sr_2Nb_5O_{15}$ (wherein $0 \leq x < 0.2$) and further contains, as accessory components, 0.05 to 20 molar parts of R (wherein R is at least one selected from the group consisting of Y, La, Pr, Nd, Sm, Eu, Gd, Tb, Dy, Ho, Er, Tm, Yb, and Lu) and 0.05 to 40 molar parts of M (wherein M is at least one selected from the group consisting of Mn, V, Li, Si, Ni, Cr, Co, Fe, Zn, Mg, and Zr) per 100 molar parts of the main component.

In a dielectric ceramic composition according to the present invention, part of Sr of the main component may be substituted by at least one selected from the group consisting of Ba and Ca.

The present invention is also directed to a monolithic ceramic capacitor that includes dielectric ceramic layers formed of any of the dielectric ceramic compositions described above.

A monolithic ceramic capacitor according to the present invention includes a plurality of dielectric ceramic layers, a plurality of internal electrodes disposed between the plurality of dielectric ceramic layers, and an external electrode electrically connected to the plurality of internal electrodes, wherein the dielectric ceramic layers are formed of any of the dielectric ceramic compositions described above, and the internal electrodes are mainly composed of Ni.

Advantages

A dielectric ceramic composition according to the present invention can have a high dielectric constant $\in$ and a sufficiently high resistivity $\rho$ because of a synergistic effect between accessory components R and M. Thus, the monolithic ceramic capacitor can have stable characteristics in applications having a high driving voltage.

Figure 1:
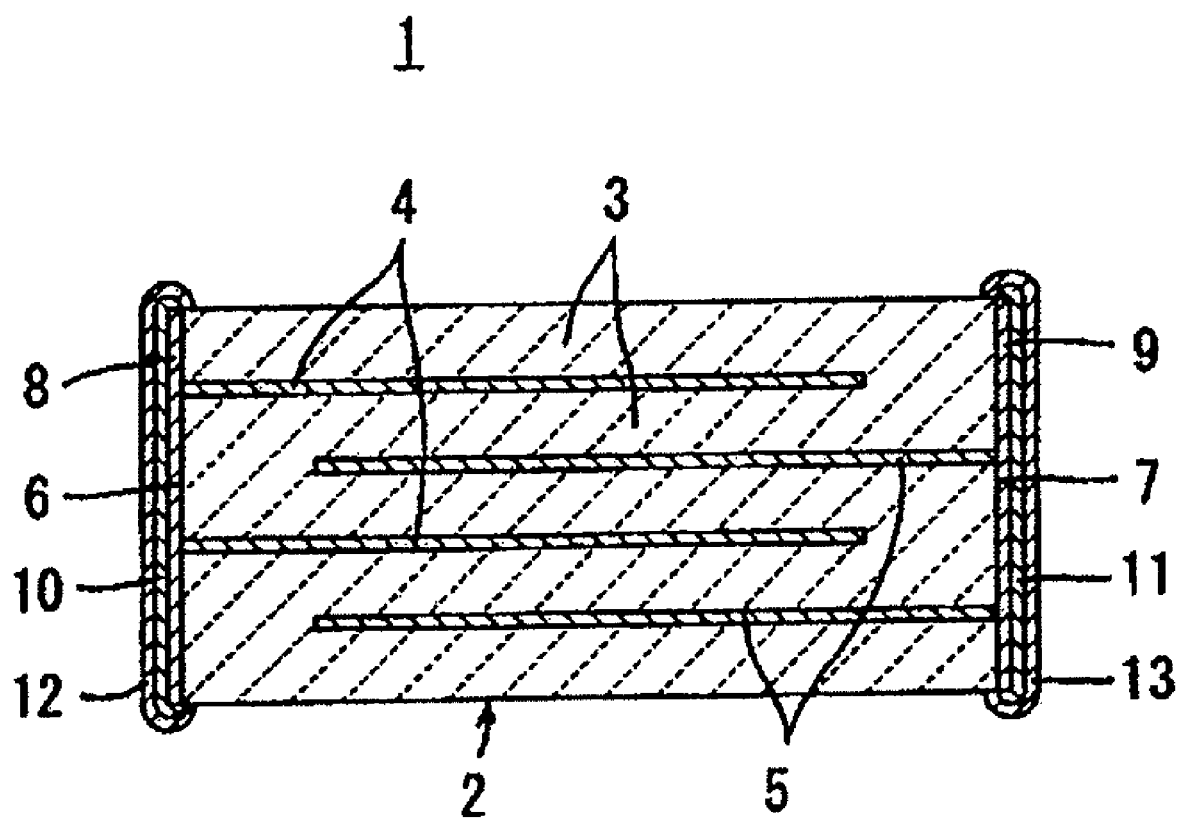
FIG. 1 is a schematic cross-sectional view of a monolithic ceramic capacitor according to an embodiment of the present invention.

REFERENCE NUMERALS 1 monolithic ceramic capacitor
2 ceramic laminate
3 dielectric ceramic layer
4, 5 internal electrode
8, 9 external electrode

BEST MODES FOR CARRYING OUT THE INVENTION

A monolithic ceramic capacitor, which is a main application of a dielectric ceramic composition according to the present invention, will be described below. FIG. 1 is a cross-sectional view of the structure of a general monolithic ceramic capacitor.

A monolithic ceramic capacitor 1 includes a ceramic laminate 2 in the shape of a rectangular parallelepiped. The ceramic laminate 2 includes a plurality of dielectric ceramic layers 3 and a plurality of internal electrodes 4 and 5 disposed between the plurality of dielectric ceramic layers 3. The internal electrodes 4 and 5 extend to the outer surface of the ceramic laminate 2. The internal electrodes 4 extending to one end face 6 of the ceramic laminate 2 and the internal electrodes 5 extending to the other end face 7 are alternately disposed in the ceramic laminate 2 with a dielectric ceramic layer 3 interposed therebetween and thereby produce capacitance.

Preferably, the electroconductive material of the internal electrodes 4 and 5 is mainly composed of nickel or a nickel alloy to reduce costs.

External electrodes 8 and 9 are formed on the outer surface of the ceramic laminate 2 on the end faces 6 and 7 and are electrically connected to the internal electrodes 4 and 5 to take the capacitance described above. An electroconductive material contained in the external electrodes 8 and 9 may be the electroconductive material used for the internal electrodes 4 and 5 and may also be silver, palladium, or a silver-palladium alloy. The external electrodes 8 and 9 are formed by applying an electroconductive paste that contains the metal or alloy powder described above and a glass frit and baking the electroconductive paste.

If necessary, first plated layers 10 and 11 formed of, for example, nickel or copper are formed on the external electrodes 8 and 9, and second plated layers 12 and 13 formed of, for example, solder or tin are formed on the first plated layers 10 and 11.

A dielectric ceramic composition according to the present invention will be described in detail below.

The main component $(K_{1-x}Na_x)Sr_2Nb_5O_{15}$ (wherein $0 \leq x < 0.2$) has a tungsten bronze crystal structure and differs completely from a perovskite structure, for example, of barium titanate.

The molar ratio of K sites, Sr sites, Nb sites, and O sites in the main component is basically 1:2:5:15 and may vary slightly as long as the tungsten bronze structure is maintained. A combined molar amount of the K and Sr sites, m, of more than 1.16 or less than 0.96 is unfavorable because sinterability deteriorates.

The content of an accessory component R ranges from 0.05 to 20 molar parts per 100 molar parts of the main component. The content of an accessory component M ranges from 0.05 to 40 molar parts per 100 molar parts of the main component. The absence of M or R reduces the effect of improving the resistivity $\rho$. A R or M content above the upper limit described above results in a decrease in resistivity $\rho$ due to the occurrence of a heterophase.

Although it is desirable that the K sites of the main component be not substituted by Na, some K sites may be substituted by less than 20% by mole of Na. An amount of 20% by mole or more of Na reduces not only the dielectric constant, but also the effect of improving resistivity due to a synergistic effect between R and M.

Some Sr sites of the main component may be substituted by Ba and/or Ca. While the allowable substitution rate depends on the required characteristic, the upper limit of Ba and Ca is approximately 70% by mole in total.

A dielectric ceramic composition according to the present invention may be manufactured by the known method. For example, a dielectric ceramic composition according to the present invention is manufactured by mixing starting materials, such as an oxide powder or a carbonate, and heat-treating the mixed powder by the solid phase method. Alternatively, a dielectric ceramic composition according to the present invention may be manufactured by a wet synthesis, such as an oxalic acid method, a hydrothermal synthesis method, or a hydrolysis method. A general method is as follows: a tungsten bronze type compound $KSr_2Nb_5O_{15}$ powder is first synthesized as the main component, and the powder is mixed with an accessory component, such as MnO or $Y_2O_3$, is molded, and is fired. In the synthesis of the $KSr_2Nb_5O_{15}$ powder, the raw materials of the main component may be mixed with the raw material of the accessory component to form a $KSr_2Nb_5O_{15}$ powder modified with the accessory component, and the modified powder may be used as a ceramic raw material powder.

EXAMPLES

Examples of a dielectric ceramic composition according to the present invention and a monolithic ceramic capacitor manufactured using the dielectric ceramic composition will be described below in Experimental Examples 1 and 2.

Experimental Example 1

The present Experimental Example examined the effects of the type and the content of accessory components R and M in the main component ($KSr_2Nb_5O_{15}$) on the electrical characteristics. Table 1 shows the compositions and the measurements of electrical characteristics of samples No. 1 to No. 35. The following is a detailed description.

Starting materials $K_2CO_3$, $SrCO_3$, and $Nb_2O_5$ of the main component were weighed to comply with the composition formula of $KSr_2Nb_5O_{15}$. The starting materials were mixed in a solvent in a ball mill, were dried, and were heat-treated at 1000° C. for two hours to prepare a $KSr_2Nb_5O_{15}$ main component powder.

$Y_2O_3$, $La_2O_3$, $Pr_6O_{11}$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $Lu_2O_3$, MnO, $V_2O_5$, $Li_2CO_3$, $SiO_2$, NiO, $Cr_2O_3$, CoO, $Fe_2O_3$, ZnO, MgO, and $ZrO_2$ powders were weighed to comply with the R content (molar part), the composition of the R element, the M content (molar part), and the composition of the M element per 100 molar parts of the main component of samples No. 1 to No. 35 in Table 1. These powders were mixed in a solvent in a ball mill and were dried to prepare ceramic raw material powders of sample No. 1 to 35.

A poly(vinyl butyral) binder and ethanol were added to each of the ceramic raw material powders of sample No. 1 to 35 and were wet-blended in a ball mill to prepare a ceramic slurry. The ceramic slurry was formed into a rectangular ceramic green sheet having a thickness of 8 μm by a doctor blade method. An electroconductive paste mainly composed of Ni was printed on the ceramic green sheet to form an electroconductive paste film used for an internal electrode.

Subsequently, a plurality of ceramic green sheets were stacked such that outwardly exposed ends of the electroconductive paste films were alternately exposed at opposite ends, forming a green laminate, as illustrated in FIG. 1. The green laminate was heated to a temperature of 350° C. in a $N_2$ gas atmosphere to decompose and burn out the binder and was fired in a reducing atmosphere of a $H_2$—$N_2$—$H_2O$ gas at an oxygen partial pressure in the range of $10^{-9}$ to $10^{-12}$ MPa at a temperature shown in Table 1 for two hours to form a ceramic laminate. A Ag paste that contained a $B_2O_3$—$SiO_2$—BaO glass frit was applied to both end faces of the laminate and was baked in a $N_2$ gas atmosphere at a temperature of 800° C. to form external electrodes electrically connected to the internal electrodes.

Monolithic ceramic capacitors of sample No. 1 to 35 were thus prepared. The monolithic ceramic capacitors had a width of 3.2 mm, a length of 4.5 mm, and a thickness of 0.5 mm, and each of the dielectric ceramic layers between the internal electrodes had a thickness of 6 μm. The number of effective dielectric ceramic layers was five, and the area of a counter electrode was $2.5 \times 10^{-6}$ m$^2$ per layer.

The capacitance C and the dielectric loss D.F. of the monolithic ceramic capacitors were measured with an automated bridge at 25° C., a frequency of 1 kHz, and 1 Vrms, and the dielectric constant $\in$ was calculated from the capacitance C. The insulation resistance R of the monolithic ceramic capacitors was measured with an insulation resistance tester at 25° C. and a direct-current voltage of 30 V for 1 minute, and the resistivity ρ was calculated from the insulation resistance R. Table 1 shows the results.

TABLE 1

| Sample No. | R content (molar part) | Composition of R element | M content (molar part) | Composition of M element | Firing temperature (° C.) | Dielectric constant $\in$ | Dielectric loss D.F. (%) | Resistivity Log (ρ/Ωm) |
|---|---|---|---|---|---|---|---|---|
| 1 | 0.03 | Y: 0.03 | 0.05 | Mn: 0.02 Cr: 0.01 Co: 0.01 Fe: 0.01 | 1150 | 2300 | 7.0 | 8.9 |
| 2 | 0.05 | Y: 0.05 | 1.1 | Mn: 1.0 Cr: 0.1 | 1175 | 2600 | 7.1 | 9.8 |
| 3 | 3.0 | Y: 3.0 | 11.0 | Mn: 10 Cr: 0.50 Co: 0.30 Fe: 0.20 | 1150 | 3900 | 8.2 | 10.6 |
| 4 | 10.0 | Y: 10 | 24.1 | Mn: 20 Cr: 4.0 Co: 0.10 | 1125 | 4400 | 11.7 | 11.0 |
| 5 | 20.0 | Y: 20 | 40.0 | Mn: 40 | 1125 | 4750 | 19.6 | 11.2 |
| 6 | 25.0 | Y: 25 | 15.6 | Mn: 10 Ni: 0.1 Cr: 2.5 Co: 2.0 Fe: 1.0 | 1125 | 4850 | 25.3 | 6.2 |
| 7 | 2.0 | La: 2 | 2.5 | V: 0.50 Co: 1.0 Fe: 1.0 | 1175 | 3750 | 7.8 | 10.3 |
| 8 | 10.0 | La: 10 | 12.1 | V: 12 Ni: 0.10 | 1150 | 4400 | 11.7 | 10.9 |
| 9 | 20.0 | La: 20 | 21.0 | V: 20 Ni: 1.0 | 1125 | 4750 | 19.6 | 11.1 |
| 10 | 2.0 | Nd: 2 | 10.0 | Li: 5.0 Ni: 3.0 Mg: 1.0 Zr: 1.0 | 1150 | 3750 | 7.8 | 10.3 |
| 11 | 5.0 | Nd: 5 | 20.0 | Li: 15 Ni: 5.0 | 1125 | 4100 | 9.1 | 11.0 |
| 12 | 18.0 | Nd: 18 | 28.0 | Li: 25 Ni: 2.0 Zn: 1.0 | 1125 | 4700 | 17.7 | 11.2 |
| 13 | 0.04 | Gd: 0.04 | 5.0 | Mn: 3.0 V: 2.0 | 1150 | 2400 | 7.1 | 9.0 |
| 14 | 2.0 | Gd: 2 | 8.0 | Mn: 1.0 V: 2.0 Ni: 4.5 Zn: 0.5 | 1150 | 3750 | 7.8 | 10.3 |
| 15 | 8.0 | Gd: 8 | 8.1 | V: 6.0 Si: 1.0 Zn: 0.1 Mg: 0.5 Zr: 0.5 | 1150 | 4300 | 10.6 | 10.7 |
| 16 | 19.0 | Gd: 19 | 8.5 | Li: 3.0 Si: 0.5 Zn: 1.0 Mg: 2.0 Zr: 2.0 | 1150 | 4700 | 18.6 | 11.1 |
| 17 | 2.0 | Dy: 2 | 12.0 | Li: 5.0 Si: 4.0 Zn: 3.0 | 1150 | 3750 | 7.8 | 10.3 |
| 18 | 7.0 | Dy: 7 | 6.0 | Mn: 1.0 V: 1.0 Li: 3.0 Mg: 0.5 Zr: 0.5 | 1150 | 4250 | 10.1 | 10.6 |
| 19 | 20.0 | Dy: 20 | 8.0 | Mn: 2.0 Li: 2.0 Mg: 2.0 Zr: 2.0 | 1150 | 4750 | 19.6 | 10.9 |
| 20 | 2.0 | Ho: 2 | 10.0 | Mg: 5.0 Zr: 5.0 | 1150 | 3750 | 7.8 | 10.3 |
| 21 | 11.0 | Ho: 11 | 9.4 | Mn: 1.0 V: 1.0 Li: 1.0 Si: 1.0 Ni: 0.2 Cr: 3.0 Co: 0.5 Fe: 0.5 Zn: 1.0 Mg: 0.1 Zr: 0.1 | 1150 | 4450 | 12.4 | 10.8 |
| 22 | 16.0 | Ho: 16 | 7.0 | Mn: 3.0 Li: 2.0 Co: 1.0 Fe: 1.0 | 1150 | 4600 | 16.0 | 11.0 |
| 23 | 2.0 | Er: 2 | 0.1 | Ni: 0.1 | 1175 | 3750 | 7.8 | 10.3 |
| 24 | 9.0 | Er: 9 | 6.0 | Mn: 3.0 V: 2.0 Ni: 1.0 | 1150 | 4350 | 11.2 | 11.0 |
| 25 | 19.0 | Er: 19 | 1.0 | Ni: 1.0 | 1175 | 4700 | 18.6 | 11.2 |
| 26 | 1.0 | Yb: 1 | 0.03 | Mn: 0.03 | 1200 | 3500 | 7.4 | 8.8 |
| 27 | 2.0 | Yb: 2 | 5.0 | Ni: 3.0 Mg: 1.0 Zr: 1.0 | 1150 | 3750 | 7.8 | 10.3 |
| 28 | 12.0 | Yb: 12 | 5.0 | Ni: 5.0 | 1150 | 4500 | 13.0 | 11.0 |
| 29 | 20.0 | Yb: 20 | 3.0 | Ni: 2.0 Zn: 1.0 | 1175 | 4750 | 19.6 | 11.2 |
| 30 | 7.0 | Pr: 7 | 6.4 | Si: 1.0 Ni: 0.2 Cr: 3.0 Co: 0.5 Fe: 0.5 Zn: 1.0 Mg: 0.1 Zr: 0.1 | 1150 | 4250 | 10.1 | 11.1 |
| 31 | 6.0 | Sm: 6 | 2.0 | Co: 1.0 Fe: 1.0 | 1175 | 4200 | 9.6 | 11.1 |
| 32 | 10.0 | Eu: 10 | 5.1 | V: 5.0 Ni: 0.1 | 1150 | 4400 | 11.7 | 11.0 |
| 33 | 17.0 | Tb: 17 | 3.5 | V: 2.0 Li: 0.5 Ni: 1.0 | 1175 | 4650 | 16.8 | 11.2 |
| 34 | 16.0 | Tm: 16 | 11.0 | Mn: 5.0 V: 1.0 Ni: 3.0 Mg: 1.0 Zr: 1.0 | 1150 | 4600 | 16.0 | 11.1 |
| 35 | 20.0 | Lu: 20 | 10.0 | V: 2.0 Li: 3.0 Ni: 5.0 | 1150 | 4750 | 19.6 | 11.3 |

Table 1 shows that, among samples No. 1 to No. 35, in capacitors having R and M contents within the scope of the present invention, the internal electrodes mainly composed of Ni, the dielectric ceramic layers can be fired simultaneously in a reducing atmosphere at a temperature of 1200° C. or less, and the monolithic ceramic capacitors had a high dielectric constant $\in$ and a high resistivity $\rho$.

By contrast, the monolithic ceramic capacitors of sample Nos. 1, 6, 13, and 26, which had an R or M content outside the scope of the present invention, had log ($\rho p/\Omega \cdot m$) of resistivity $\rho$ as low as less than 9.5.

Experimental Example 2

The present Experimental Example examined the effects of substituting Na for some K sites in a composition containing the main component ($KSr_2Nb_5O_{15}$) and an accessory components R and M on electrical characteristics. Table 2 shows the compositions and the measurements of electrical characteristics of samples No. 101 to No. 123. The following is a detailed description.

Starting materials $K_2CO_3$, $Na_2CO_3$, $SrCO_3$, and $Nb_2O_5$ of the main component were weighed such that x of the composition formula $(K_{1-x}Na_x)Sr_2Nb_5O_{15}$ was equal to x of samples No. 101 to No. 123 shown in Table 2. These starting materials were mixed in a solvent in a ball mill, were dried, and were heat-treated at 1000° C. for two hours to prepare a $(K_{1-x}Na_x)Sr_2Nb_5O_{15}$ main component powder.

$Y_2O_3$, $La_2O_3$, $Nd_2O_3$, $Eu_2O_3$, $Gd_2O_3$, $Dy_2O_3$, $Ho_2O_3$, $Er_2O_3$, $Yb_2O_3$, MnO, $V_2O_5$, $Li_2CO_3$, $SiO_2$, NiO, $Cr_2O_3$, CoO, $Fe_2O_3$, ZnO, MgO, and $ZrO_2$ powders were weighed to comply with the R content (molar part), the composition of the R element, the M content (molar part), and the composition of the M element per 100 molar parts of the main component of samples No. 101 to No. 123 in Table 2. These powders were mixed in a solvent in a ball mill and were dried to prepare ceramic raw material powders of sample No. 101 to 123.

The ceramic raw material powders of sample No. 101 to 123 were used to form a green laminate in the same process as in Experimental Example 1. The green laminate was heated to a temperature of 350° C. in a $N_2$ gas atmosphere to decompose and burn out the binder and was fired in a reducing atmosphere of a $H_2$—$N_2$—$H_2O$ gas at an oxygen partial pressure in the range of $10^{-9}$ to $10^{-12}$ MPa at a temperature shown in Table 3 for two hours to form a ceramic laminate.

External electrodes electrically connected to the internal electrodes were formed on the ceramic laminate in the same process as in Experimental Example 1. Monolithic ceramic capacitors of sample No. 101 to 123 were thus prepared.

The dielectric constant $\in$, the dielectric loss D. F., and the resistivity $\rho$ at 25° C. of the monolithic ceramic capacitors were determined in the same way as in Experimental Example 1. Table 2 shows the results

TABLE 2

| Sample No. | x | R content (molar part) | Composition of R element | M content (molar part) | Composition of M element | Firing temperature (° C.) | Dielectric constant $\epsilon$ | Dielectric loss D.F. (%) | Resistivity Log($\rho/\Omega m$) |
|---|---|---|---|---|---|---|---|---|---|
| 101 | 0.05 | 0.03 | Y: 0.03 | 6.0 | Mn: 5.0 Cr: 0.5 Co: 0.3 Fe: 0.2 | 1150 | 2350 | 6.5 | 8.8 |
| 102 | 0.10 | 0.05 | Y: 0.05 | 1.1 | Mn: 1.0 Cr: 0.1 | 1175 | 2250 | 6.2 | 9.7 |
| 103 | 0.19 | 3.0 | La: 3.0 | 11.0 | La: 10 Cr: 0.5 Co: 0.3 Fe: 0.2 | 1150 | 2500 | 5.0 | 10.6 |
| 104 | 0.05 | 20.0 | La: 20.0 | 40.0 | Mn: 40 | 1125 | 4500 | 18.0 | 9.5 |
| 105 | 0.10 | 25.0 | Nd: 25.0 | 15.6 | Mn: 10 Ni: 0.1 Cr: 2.5 Co: 2.0 Fe: 1.0 | 1125 | 4200 | 22.3 | 7.0 |
| 106 | 0.15 | 2.0 | Nd: 2.0 | 2.5 | V: 0.5 Co: 1.0 Fe: 1.0 | 1175 | 2700 | 5.9 | 9.7 |
| 107 | 0.19 | 10.0 | Gd: 10.0 | 12.1 | V: 12 Ni: 0.1 | 1150 | 2900 | 7.1 | 10.5 |
| 108 | 0.05 | 2.0 | Gd: 2.0 | 10.0 | Li: 5.0 Ni: 3.0 Mg: 1.0 Zr: 1.0 | 1150 | 3550 | 7.1 | 10.3 |
| 109 | 0.10 | 5.0 | Dy: 5.0 | 20.0 | Li: 15 Ni: 5.0 | 1125 | 3600 | 8.0 | 10.6 |
| 110 | 0.15 | 18.0 | Dy: 18.0 | 28.0 | Li: 25 Ni: 2.0 Zn: 1.0 | 1125 | 3700 | 13.5 | 10.9 |
| 111 | 0.25 | 0.04 | Ho: 0.04 | 5.0 | Mn: 3.0 V: 2.0 | 1150 | 1600 | 4.3 | 8.9 |
| 112 | 0.05 | 2.0 | Ho: 2.0 | 8.0 | Mn: 1.0 V: 2.0 Ni: 4.5 Zn: 0.5 | 1150 | 3550 | 7.1 | 10.1 |
| 113 | 0.10 | 8.0 | Er: 8.0 | 8.1 | V: 6.0 Si: 1.0 Zn: 0.1 Mg: 0.5 Zr: 0.5 | 1150 | 3770 | 9.3 | 10.4 |
| 114 | 0.15 | 19.0 | Er: 19.0 | 8.5 | Li: 3.0 Si: 0.5 Zn: 1.0 Mg: 2.0 Zr: 2.0 | 1150 | 3550 | 14.2 | 10.6 |
| 115 | 0.19 | 2.0 | Yb: 2.0 | 12.0 | Li: 5.0 Si: 4.0 Zn: 3.0 | 1150 | 2400 | 4.7 | 10.1 |
| 116 | 0.10 | 7.0 | Yb: 7.0 | 6.0 | Mn: 1.0 V: 1.0 Li: 3.0 Mg: 0.5 Zr: 0.5 | 1150 | 3700 | 8.9 | 10.3 |
| 117 | 0.30 | 2.0 | Dy: 2.0 | 5.0 | Mn: 5.0 | 1150 | 900 | 6.0 | 8.3 |
| 118 | 0.30 | 8.0 | Dy: 8.0 | 5.0 | Mn: 5.0 | 1150 | 1000 | 6.5 | 8.2 |
| 119 | 0.30 | 10.0 | Dy: 10.0 | 5.0 | Mn: 5.0 | 1175 | 1050 | 6.5 | 8.2 |
| 120 | 0.50 | 3.0 | Dy: 3.0 | 5.0 | Mn: 5.0 | 1150 | 800 | 5.0 | 8.1 |
| 121 | 0.50 | 9.0 | Dy: 9.0 | 5.0 | Mn: 5.0 | 1150 | 750 | 5.0 | 8.0 |
| 122 | 0.70 | 4.0 | Dy: 4.0 | 5.0 | Mn: 5.0 | 1150 | 650 | 4.5 | 8.2 |
| 123 | 0.70 | 11.0 | Dy: 11.0 | 5.0 | Mn: 5.0 | 1175 | 700 | 4.5 | 8.2 |

Table 2 shows that, in samples Nos. 102 to 104, 106 to 110, and 112 to 116, which had a composition within the scope of the present invention, the internal electrodes mainly composed of Ni, the dielectric ceramic layers can be fired simultaneously in a reducing atmosphere at a temperature of 1200° C. or less, and the monolithic ceramic capacitors had a high dielectric constant $\in$ and a high resistivity $\rho$.

By contrast, although the monolithic ceramic capacitors of sample No. 117 to 123 having a Na substitution rate x of 0.2 or more and R and M contents within the scope of the present invention, they had log ($\rho/\Omega \cdot m$) of resistivity p as low as less than 9.5. The monolithic ceramic capacitor of sample No.

111, which had a Na substitution rate x of 0.2 or more and an R content outside the scope of the present invention, had log ($\rho/\Omega \cdot m$) of resistivity $\rho$ as low as less than 9.5.

It is to be understood that the embodiments and examples disclosed herein are illustrated by way of example and not by way of limitation in all respects. The scope of the present invention is not defined by the embodiments and examples described above but is defined by the claims and is intended to include all the equivalents of the claims and modifications and alterations within the scope of the present invention.

INDUSTRIAL APPLICABILITY

A dielectric ceramic composition according to the present invention has a high dielectric constant $\in$ and a sufficiently high resistivity $\rho$ and is therefore applicable to monolithic ceramic capacitors having high driving voltages.

The invention claimed is:

1. A dielectric ceramic composition comprising a tungsten bronze type complex oxide main component having a composition formula of $((K_{1-x}Na_x)(Sr_{2-y-z}Ba_yCa_z)_mNb_5O_{15}$ wherein $0 \leq x < 0.2$, y and z are each 0 to 1.4 and $y+z \leq 1.4$, $0.96 \leq m \leq 1.16$, 0.05 to 20 molar parts per 100 molar parts of the main component of R wherein R is at least one member selected from the group consisting of Y, La, Pr, Nd, Sm, Eu, Gd, Tb, Dy, Ho, Er, Tm, Yb, and Lu, and 0.05 to 40 molar parts per 100 molar parts of the main component of M wherein M is at least one member selected from the group consisting of Mn, V, Li, Si, Ni, Cr, Co, Fe, Zn, Mg, and Zr.

2. The dielectric ceramic composition according to claim 1, wherein x is 0.

3. The dielectric ceramic composition according to claim 2, wherein y and z are 0.

4. The dielectric ceramic composition according to claim 3, wherein the amount per 100 molar parts of main component of R is 1-19 molar parts, and of M is 0.1-28 molar parts.

5. The dielectric ceramic composition according to claim 4, wherein M is at least two members of said group.

6. The dielectric ceramic composition according to claim 5, wherein R is a single member of said group.

7. The dielectric ceramic composition according to claim 1, wherein the amount per 100 molar parts of main component of R is 1-19 molar parts, and of M is 0.1-28 molar parts.

8. The dielectric ceramic composition according to claim 1, wherein M is at least two members of said group.

9. The dielectric ceramic composition according to claim 1, wherein R is a single member of said group.

10. A monolithic ceramic capacitor comprising: a plurality of dielectric ceramic layers; a plurality of internal electrodes each of which is disposed between a pair of adjacent dielectric ceramic layers; and a pair of external electrodes each of which is electrically connected to a different internal electrode, wherein the dielectric ceramic layers are formed of a dielectric ceramic composition according to claim 9, and the internal electrodes comprise Ni.

11. A monolithic ceramic capacitor comprising: a plurality of dielectric ceramic layers; a plurality of internal electrodes each of which is disposed between a pair of adjacent dielectric ceramic layers; and a pair of external electrodes each of which is electrically connected to a different internal electrode, wherein the dielectric ceramic layers are formed of a dielectric ceramic composition according to claim 8, and the internal electrodes comprise Ni.

12. A monolithic ceramic capacitor comprising: a plurality of dielectric ceramic layers; a plurality of internal electrodes each of which is disposed between a pair of adjacent dielectric ceramic layers; and a pair of external electrodes each of which is electrically connected to a different internal electrode, wherein the dielectric ceramic layers are formed of a dielectric ceramic composition according to claim 7, and the internal electrodes comprise Ni.

13. A monolithic ceramic capacitor comprising: a plurality of dielectric ceramic layers; a plurality of internal electrodes each of which is disposed between a pair of adjacent dielectric ceramic layers; and a pair of external electrodes each of which is electrically connected to a different internal electrode, wherein the dielectric ceramic layers are formed of a dielectric ceramic composition according to claim 6, and the internal electrodes comprise Ni.

14. A monolithic ceramic capacitor comprising: a plurality of dielectric ceramic layers; a plurality of internal electrodes each of which is disposed between a pair of adjacent dielectric ceramic layers; and a pair of external electrodes each of which is electrically connected to a different internal electrode, wherein the dielectric ceramic layers are formed of a dielectric ceramic composition according to claim 5, and the internal electrodes comprise Ni.

15. A monolithic ceramic capacitor comprising: a plurality of dielectric ceramic layers; a plurality of internal electrodes each of which is disposed between a pair of adjacent dielectric ceramic layers; and a pair of external electrodes each of which is electrically connected to a different internal electrode, wherein the dielectric ceramic layers are formed of a dielectric ceramic composition according to claim 4, and the internal electrodes comprise Ni.

16. A monolithic ceramic capacitor comprising: a plurality of dielectric ceramic layers; a plurality of internal electrodes each of which is disposed between a pair of adjacent dielectric ceramic layers; and a pair of external electrodes each of which is electrically connected to a different internal electrode, wherein the dielectric ceramic layers are formed of a dielectric ceramic composition according to claim 3, and the internal electrodes comprise Ni.

17. A monolithic ceramic capacitor according to claim 16, wherein the external electrodes comprise at least one of Ni, Ag and Pd.

18. A monolithic ceramic capacitor according to claim 16, wherein M is at least two members of said group, and R is a single member of said group.

19. A monolithic ceramic capacitor comprising: a plurality of dielectric ceramic layers; a plurality of internal electrodes each of which is disposed between a pair of adjacent dielectric ceramic layers; and a pair of external electrodes each of which is electrically connected to a different internal electrode, wherein the dielectric ceramic layers are formed of a dielectric ceramic composition according to claim 2, and the internal electrodes comprise Ni.

20. A monolithic ceramic capacitor comprising: a plurality of dielectric ceramic layers; a plurality of internal electrodes each of which is disposed between a pair of adjacent dielectric ceramic layers; and a pair of external electrodes each of which is electrically connected to a different internal electrode, wherein the dielectric ceramic layers are formed of a dielectric ceramic composition according to claim 1, and the internal electrodes comprise Ni.

* * * * *